US012584517B2

(12) United States Patent　　　　　　(10) Patent No.: US 12,584,517 B2
Lee et al.　　　　　　　　　　　　　　　(45) Date of Patent: Mar. 24, 2026

(54) INTEGRATED HYBRID THRUST BEARING

(71) Applicant: KOREA INSTITUTE OF SCIENCE AND TECHNOLOGY, Seoul (KR)

(72) Inventors: Yong Bok Lee, Seoul (KR); YunSeok Ha, Seoul (KR); Jungwan Kim, Seoul (KR); Byul An, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 26 days.

(21) Appl. No.: 18/654,131

(22) Filed: May 3, 2024

(65) Prior Publication Data

US 2024/0384755 A1　　Nov. 21, 2024

(30) Foreign Application Priority Data

May 18, 2023　(KR) ........................ 10-2023-0064517

(51) Int. Cl.
　　*F16C 17/04*　　　(2006.01)
　　*F16C 32/04*　　　(2006.01)
(52) U.S. Cl.
　　CPC ........ *F16C 17/042* (2013.01); *F16C 32/0402* (2013.01)
(58) Field of Classification Search
　　CPC ........................... F16C 17/042; F16C 32/0402
　　See application file for complete search history.

(56) References Cited

U.S. PATENT DOCUMENTS 6,353,273 B1 * 3/2002 Heshmat ............. F16C 32/0444
　　　　　　　　　　　　　　　　　　　384/103

FOREIGN PATENT DOCUMENTS

EP　　　　0687827 A1 * 12/1995 ............ F16C 39/066
JP　　　　9-42289 A　　2/1997
KR　　10-2010-0048325 A　　5/2010
KR　　　20170032757 A * 3/2017 ........... F04D 29/041

OTHER PUBLICATIONS

Machine Translation of KR-20170032757-A (Year: 2017).*
Korean Office Action issued on Mar. 26, 2025, in corresponding Korean Patent Application No. 10-2023-0064517. (4pages in Korean).

* cited by examiner

*Primary Examiner* — Alan B Waits
(74) *Attorney, Agent, or Firm* — NSIP Law

(57)　　　　　　　ABSTRACT

The present disclosure relates to a hybrid thrust bearing that combines an airfoil bearing and a magnetic bearing to support a rotating shaft with a disk-shaped thrust disk, and the magnetic bearing includes a disk-shaped housing into which the rotation shaft is inserted through a hole formed in a center and facing the thrust disk, a ring-shaped inner pole part formed around the hole on one side of the housing facing the thrust disk, a ring-shaped outer pole part disposed outside the inner pole part, an attachment part provided between the inner pole part and the outer pole part, and a coil stored in the attachment part, wherein a part of the airfoil bearing is inserted into the attachment part.

6 Claims, 10 Drawing Sheets

INTEGRATED HYBRID THRUST BEARING

CROSS-REFERENCE TO RELATED APPLICATIONS

This application claims the benefit under 35 USC 119 (a) of Korea Patent Application No. 10-2023-0064517 filed on May 18, 2023, in the Korean Intellectual Property Office, the entire disclosure of which is incorporated herein by reference for all purposes.

BACKGROUND OF THE INVENTION

Field of the Invention

The present invention relates to a hybrid bearing combining a magnetic bearing and an airfoil bearing, specifically integrating an airfoil bearing into a magnetic bearing to prevent an increase in the gap between a thrust disk and the magnetic bearing, thereby maintaining the performance of the magnetic bearing while supporting axial load and reducing lateral vibrations of the rotor.

Description of the Related Art

Thrust bearings are intended to support an axial load applied to a rotor of a rotary machine such as a turbomachinery. The thrust bearings include bump foil bearings, leaf foil bearings, porous foil bearings, magnetic bearings, etc. using air lubrication or electromagnetic force to support the axial load of the rotor of high-speed rotating machinery such as aircraft auxiliary power unit (APU) or air conditioning system (ACM), and hybrid thrust bearings that use both air lubrication and electromagnetic forces are also being studied.

In general, it is advantageous for airfoil thrust bearings to maintain high stiffness values by thickening the foil in order to maintain high load capacity, but the values are limited due to excessive preload during starting. On the other hand, magnetic thrust bearings support the axial load using electromagnetic force, so as the axial load increases, the amount of applied control current increases, as a result, they have the problem of increased power consumption and low energy efficiency. Therefore, a hybrid thrust bearing combining an airfoil bearing and a magnetic bearing has been developed.

Hybrid thrust bearing can compensate for the low load capacity, which is a disadvantage of airfoil bearings, with magnetic bearings, and are very useful in that airfoil bearings compensate for the performance degradation of magnetic bearings due to power saving and demagnetization phenomena.

However, in the hybrid thrust bearing structure that combines airfoil and magnetic proposed to date, an airfoil bearing is simply combined with a magnetic bearing, so there is a problem that the performance of the magnetic bearing deteriorates since the gap between the magnetic bearing and the thrust disk increases due to the airfoil bearing located between the magnetic bearing and the thrust disk In relation to this, Korean Patent Publication No. 10-2010-0048325 discloses a hybrid thrust bearing combining a magnetic bearing portion using permanent magnets and a magnetic bearing portion using electromagnets, also discloses a configuration in which a first air foil bearing portion is attached to the rear side of the magnetic bearing portion of the permanent magnet, and a second air foil bearing portion is attached to the front side of the magnetic bearing portion of the electromagnet. However, even in this prior patent, the airfoil bearing is simply added between the thrust disk and the magnetic bearing, so there is a problem that the performance of the magnetic bearing deteriorates as the gap between the thrust disk and the magnetic bearing increases.

PRIOR TECHNICAL LITERATURE

Patent Document (Patent Document 1) Korean Patent Publication No. 10-2010-0048325 "Hybrid thrust bearing"

SUMMARY OF THE INVENTION

The technical problem that the present invention aims to solve is to integrate an airfoil bearing into the magnetic bearing of a hybrid thrust bearing structure, in order to prevent an increase in the gap between the thrust disk and the magnetic bearing.

In order to solve the above technical problem, the present disclosure relates to a hybrid thrust bearing that combines an airfoil bearing and a magnetic bearing to support a rotating shaft with a disk-shaped thrust disk, and the magnetic bearing includes a disk-shaped housing into which the rotation shaft is inserted through a hole formed in a center and facing the thrust disk, a ring-shaped inner pole part formed around the hole on one side of the housing facing the thrust disk, a ring-shaped outer pole part disposed outside the inner pole portion, an attachment part provided between the inner pole portion and the outer pole part, and a coil stored in the attachment part, wherein a part of the airfoil bearing is inserted into the attachment part.

The airfoil bearing mentioned above comprises an airfoil pad covering the upper surface of the coil and installed on the attachment part, wherein the depth of the attachment part is the sum of the thicknesses of the coil and the airfoil pad.

The airfoil bearing may further include a thrust bump foil installed over the airfoil pad, and a top foil installed over the thrust bump foil, and the thrust bump foil and the top foil may be located outside the attachment part.

The outer pole part may further include a column protruding outward, and the airfoil pad may be fastened to the column.

The airfoil pad may further include an extension portion extending above the column and coupled to the column.

The outer pole part may further include a slot that guides a connection portion to a part where the column is connected.

A surface area of the inner pole part may be less than a surface area of the outer pole part.

According to an embodiment of the present invention, since the airfoil bearing is integrally installed with the magnetic bearing, it solves the previous problem of degradation in the performance of the magnetic bearing due to the gap between the magnetic bearing and the thrust disk not increasing.

DETAILED DESCRIPTION OF THE EMBODIMENTS

Hereinafter, embodiments of the present disclosure will be described in detail with reference to the drawings. However, detailed descriptions of known functions or configurations that may obscure the gist of the embodiments are omitted in the following description and attached drawings. In addition, throughout the specification, 'including' a certain component does not mean excluding other components unless specifically stated to the contrary, but rather means that other components may be further included.

Additionally, terms such as first, second, etc. may be used to describe various components, but the components should not be limited by the above terms. The above terms may be used for the purpose of distinguishing one component from another component. For example, a first component may be referred to as a second component without departing from the scope of the present disclosure, and similarly, the second component may also be referred to as the first component.

The terms used in the present disclosure are only used to describe specific embodiments and are not intended to limit the present disclosure. Singular expressions include plural expressions unless the context clearly indicates otherwise. In the present disclosure, terms such as "comprise" or "include" are intended to designate the presence of described features, numbers, steps, operations, components, parts, or combinations thereof, and it should be understood that this does not exclude in advance the presence or addition of one or more other features, numbers, steps, operations, components, parts, or combinations thereof.

Unless specifically defined otherwise, all terms used herein, including technical or scientific terms, have the same meaning as generally understood by a person of ordinary skill in the technical field to which the present disclosure pertains. Terms such as those defined in commonly used dictionaries should be interpreted as having a meaning consistent with the meaning in the context of the related technology, and unless clearly defined in the present disclosure, should not be interpreted in an idealized or excessively formal meaning.

Hereinafter, a hybrid thrust bearing according to an embodiment of the present disclosure will be described with reference to FIGS. 1 to 4.

Figure 1:
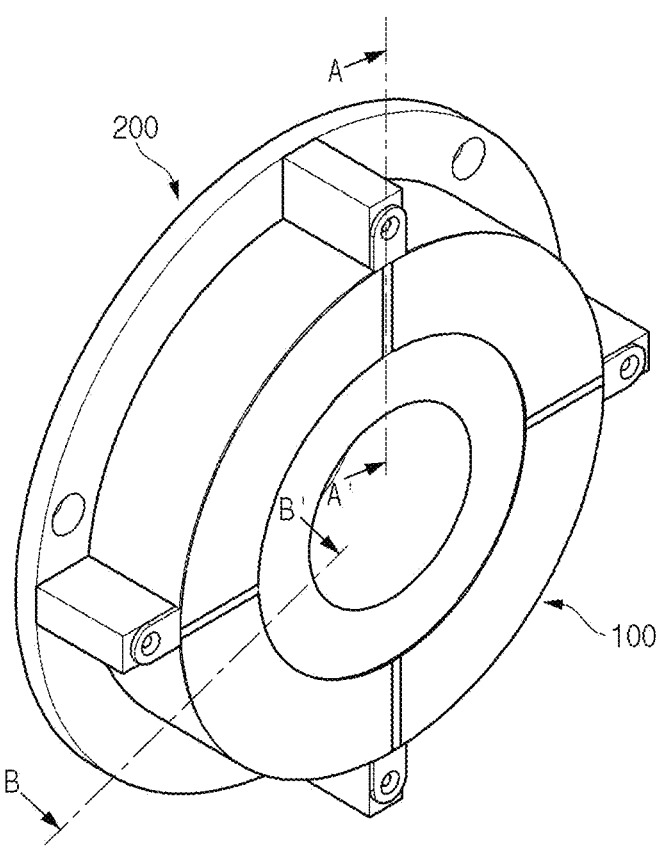
FIG. 1 is an exploded perspective view of a hybrid thrust bearing of one embodiment.
Figure 2:
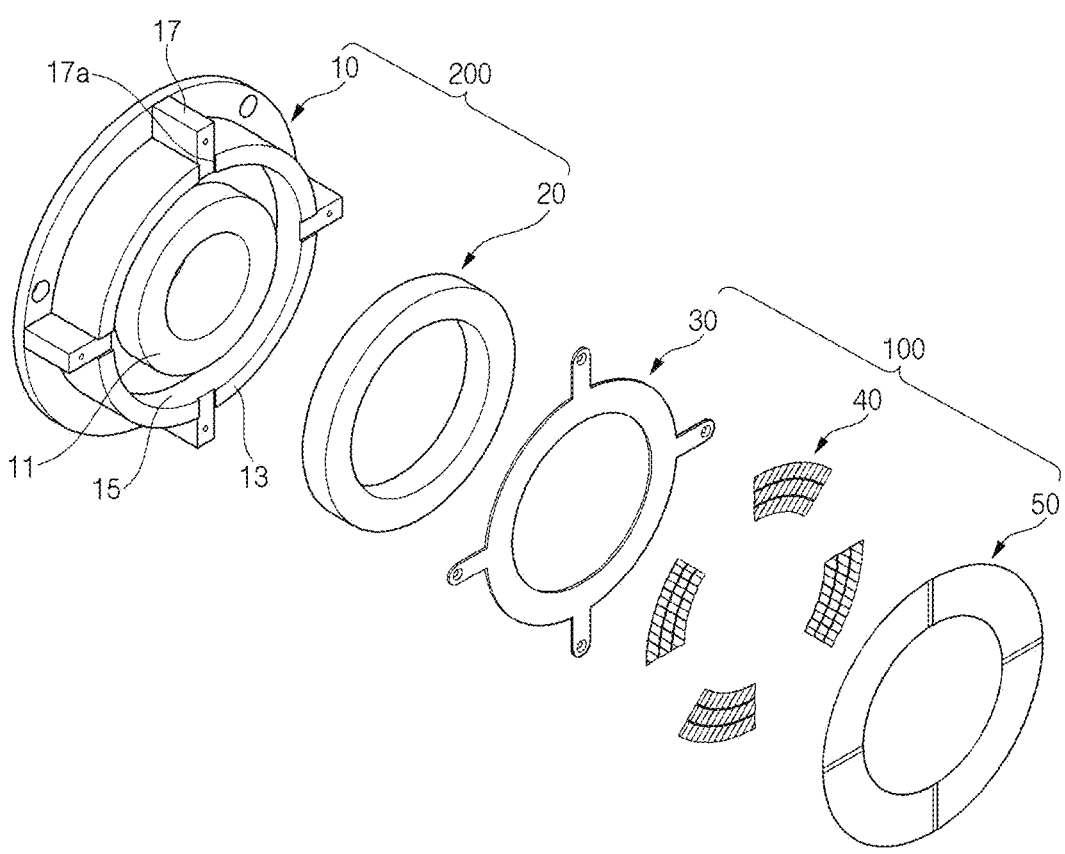
FIG. 2 is a diagram showing a combined state of a hybrid thrust bearing shown in FIG. 1.
Figure 3:
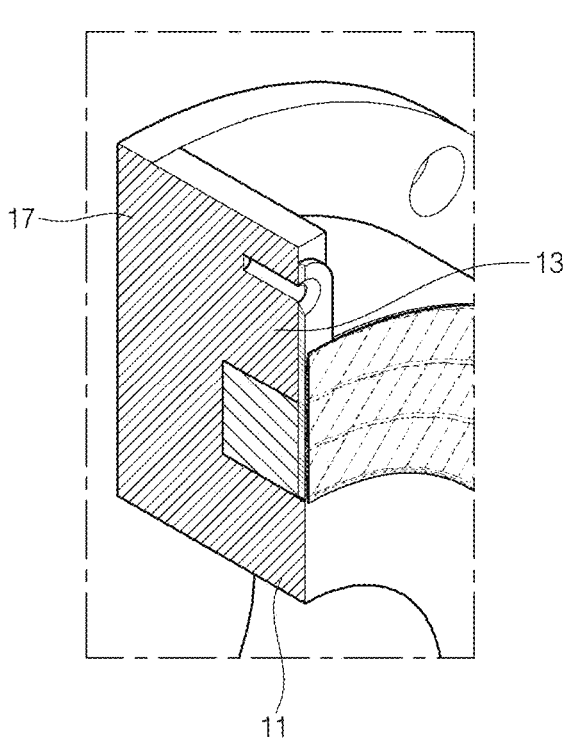
FIGS. 3 and 4 show cross-sectional views taken along lines A-A' and B-B' of FIG. 2.
Figure 4:
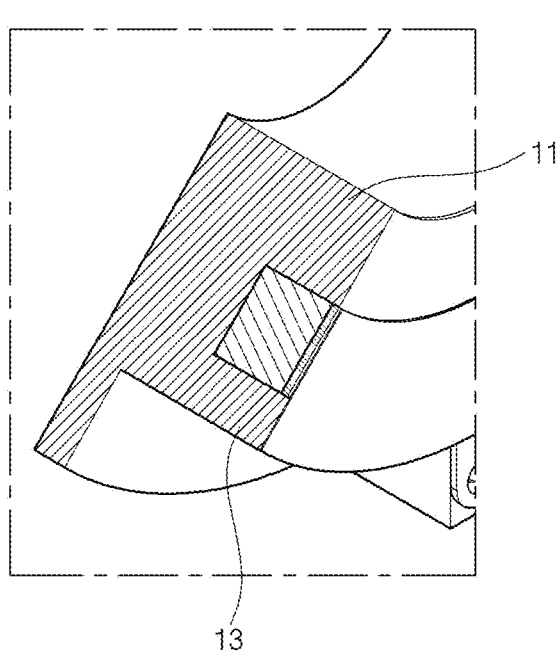

FIG. 1 is an exploded perspective view of a hybrid thrust bearing of one embodiment, and FIG. 2 is a diagram showing a combined state. FIGS. 3 and 4 show cross-sectional views taken along lines A-A' and B-B' of FIG. 2.

Referring to these drawings, a hybrid thrust bearing having an integrated structure of one embodiment relates to a hybrid thrust bearing in which an airfoil bearing 100 supporting a rotating shaft having a disk-shaped thrust disk is integrally installed on a magnetic bearing 200, and the magnetic bearing 200 includes a disk-shaped housing 10 into which the rotation shaft is inserted through a hole formed in a center and facing the thrust disk, a ring-shaped inner pole part 11 formed around the hole on one side of the housing facing the thrust disk, a ring-shaped outer pole part 13 disposed outside the inner pole part, attachment part 15 provided between the inner pole part and the outer pole part, and a coil 20 stored in the attachment part, wherein a part of the airfoil bearing 100 is inserted into the attachment part.

The airfoil bearing 100 levitates the rotating shaft using the dynamic pressure of air generated when the shaft rotates, and the magnetic bearing 200 levitates the shaft using magnetic force caused by a magnetic field.

The airfoil bearing 100 forms an air film between the thrust disks (301 in FIGS. 6 and 7), so it has low friction and is often used in high-speed rotating machinery. The magnetic bearing 200 has the advantage of being easy to control because it can control the magnetic force of the electromagnet. On the other hand, there is a problem of poor performance due to loss of load capacity during high-speed rotation.

Therefore, in one embodiment, a hybrid thrust bearing utilizes both an airfoil bearing 100 and a magnetic bearing 200 to leverage their respective advantages. In particular, to prevent degradation in the performance of the magnetic bearing 200 that may occur when simply adding an airfoil bearing, the airfoil bearing 100 is integrated into the magnetic bearing 200 to prevent an increase in the gap between the magnetic bearing 200 and the thrust disk.

The hybrid thrust bearing of one embodiment is a structure that can control the axial load and lateral vibration of the turbomachinery without additional back-up bearings, and since the airfoil pad is attached to the slot provided at the pole of the magnetic bearing, it is possible to have an integrated structure that does not increase the gap between the magnetic bearing and the thrust disk.

The airfoil bearing 100 includes an airfoil pad 30, a thrust bump foil 40, and a thrust top foil 50.

The air foil pad 30 covers the upper surface of the coil of the magnetic bearing 200 and is coupled to the magnetic bearing 200. The coupling relationship between the airfoil pad and the magnetic bearing 200 is described in detail below.

The thrust bump foil 40 has a foil-shaped structure and functions as a damper, and the thrust top foil 50 is disposed adjacent to the thrust disk and an air film is formed between the thrust top foil and the thrust disk during rotation to levitate the thrust disk.

The magnetic bearing 200 includes the housing 10 and the coil 20.

The housing 10 includes a hole into which the rotation shaft can be inserted, and its overall shape has the shape of a disk. The housing 10 is made of a conductor.

The housing 10 includes the inner pole part 11 and the outer pole part 13 in a direction toward the thrust disk.

The inner pole part 11 is located around the hole of the housing and is formed to have an approximately ring shape.

The outer pole part 13 is located away from the inner pole part 11 toward the outside, and is formed to have a ring shape like the inner pole part 11.

The attachment part 15 is provided between the inner pole part 11 and the outer pole part 13, and the ring-shaped coil 20 is stored in this attachment part 15.

Figure 5:
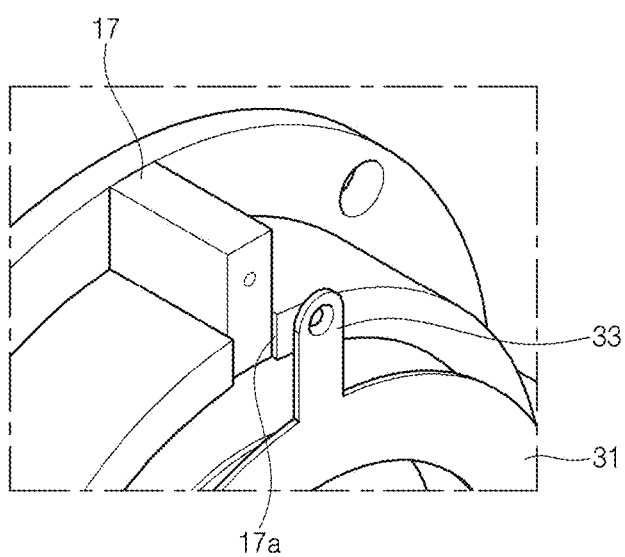
FIG. 5 is an enlarged view showing a part of a bearing shown in FIG. 2.

FIG. 5 is an enlarged view showing a part of a bearing shown in FIG. 2. With reference to this, a configuration in which the airfoil pad 30, which is part of the airfoil bearing, is inserted and installed into the magnetic bearing 200 will be examined in detail.

To accommodate the coupling of the airfoil pad 30 with the magnetic bearing 200, the outer peripheral pole portion 13 includes multiple protruding columns 17 formed outward. The columns 17 have approximately rectangular prism shapes and feature holes on their upper surfaces for bolt fastening.

Meanwhile, the outer pole part 13 further includes a slot 17a formed concave inward at a portion where the column 17 is connected. This slot 17a guides the fastening location when the airfoil pad 30 is fastened to the magnetic bearing 200 and locates the airfoil pad 30 at the fastening location. Additionally, the slot 17a allows the airfoil pad 30 to be located inside the attachment part 15 when coupled to the magnetic bearing side. Therefore, since at least part of the airfoil bearing is located inside the magnetic bearing, it prevents the gap between the magnetic bearing and the thrust disk from increasing.

Meanwhile, the airfoil pad 30 includes a ring-shaped body portion 31 and an extension portion 33 protruding outward from the body portion 31.

The body portion 31 has a ring shape, and a width of the ring is substantially the same as a width of the attachment part 15 provided in the housing 10. Accordingly, when the airfoil pad 30 is coupled to the magnetic bearing 200, it can be inserted into the attachment part 15 while covering the coil 20 stored in the attachment part 15.

The extension portion 33 is located on the column 17 and can be bolted to the column 17 through a hole provided in the extension portion 33. At this time, the extension portion 33 can be easily located on the column 17 by being guided by the slot 17a provided in the outer pole part 13.

Meanwhile, the airfoil pad 30 is inserted and installed into the attachment part 15 of the housing 10, and a depth of the attachment part 15 is configured to be substantially equal to a combined thickness of the coil 20 and the airfoil pad 30. With this configuration, since some components of the airfoil bearing 100 can be inserted into the magnetic bearing 200, it is possible to solve the problems of the prior patent described above by preventing the gap between the magnetic bearing 200 and the thrust disk from increasing.

Figure 6:
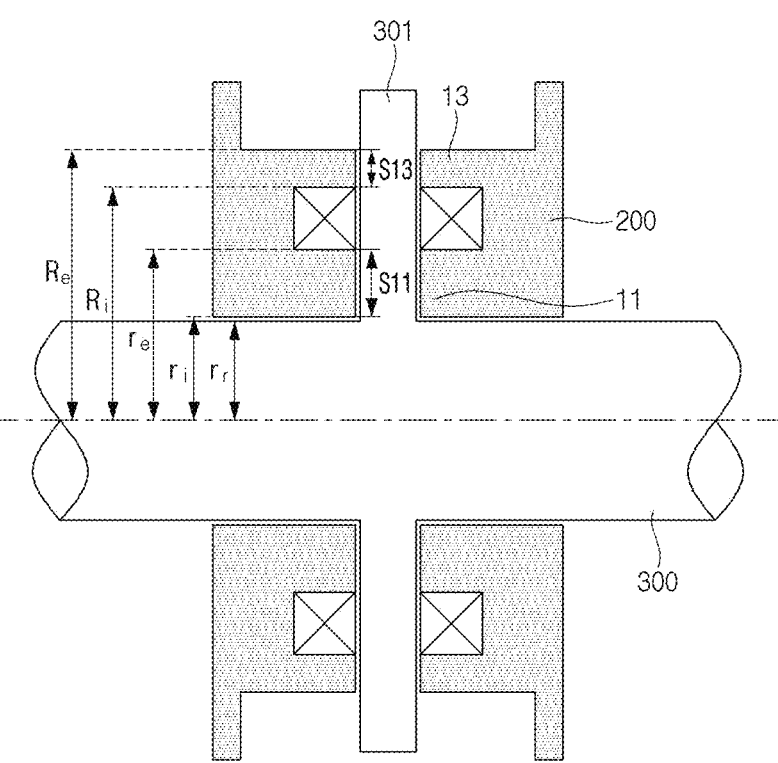
FIG. 6 is a diagram for explaining a surface area of a pole portion.

FIG. 6 is a diagram for explaining a surface area of a pole portion. The hybrid thrust bearing in one embodiment is operated in a pair arranged to face each other based on the thrust disk 301 provided on the rotating shaft 300. At this time, the pole units 11 and 13 are arranged to face the thrust disk 301.

As described above, the hybrid thrust bearing of one embodiment prevents the gap between the magnetic bearing 200 and the thrust disk 301 from increasing by partially inserting and installing a part of the airfoil bearing 100 (airfoil pad) into the magnetic bearing 200.

Meanwhile, in the magnetic bearing 200, the flux of the inner pole part 11 and the flux of the outer pole part 13 must be the same, but the flux of the inner pole part 11 and the outer pole part 13 changes due to the slot 17a provided in the outer pole part 13. In the present disclosure, the area of the outer pole part 13 is configured to be larger than the area of the inner pole part 11 so that the fluxes of the inner and outer pole part s 11 and 13 have the same value.

Equations 1 and 2 below represent formulas for calculating the surface areas of the inner pole part and the outer pole part.

$$S13 = \frac{\pi\left((2 \times R_e)^2 - (2 \times R_i)\right)^2}{4} \qquad \text{[Equation 1]}$$

-continued $$S11 = \frac{\pi\left((2 \times R_e)^2 - (2 \times R_i)\right)^2}{4} \qquad \text{[Equation 2]}$$

Additionally, Tables 1 and 2 below show the results of calculating the surface area and flux of the inner and outer pole part s according to Equations 1 and 2 above.

TABLE 1

| | S11 |
|---|---|
| parameter | value |
| Ri | 0.04 m |
| Re | 0.0508 m |
| S11 | 0.00077 m² |
| Flux | 0.448 N/(m*A) |

TABLE 2

| | S13 |
|---|---|
| parameter | Value |
| Ri | 0.0846 m |
| Re | 0.0908 m |
| S11 | 0.00085 m² |
| Flux | 0.448 N/(m*A) |

In this way, in one embodiment, the surface area (S13) of the outer pole part (13) is configured to be larger than the surface area (S11) of the inner pole part (S11), so that the fluxes generated in the inner and outer pole part s are adjusted to be equal.

Figure 7:
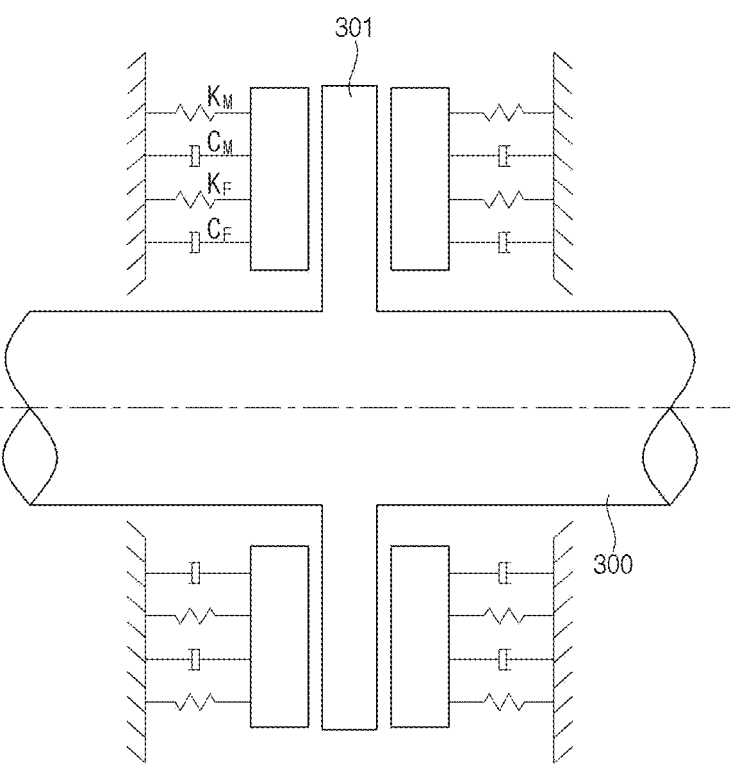
FIG. 7 is a diagram for explaining an effect of a hybrid thrust bearing of the above-described embodiment.

FIG. 7 is a diagram for explaining an effect of a hybrid thrust bearing of the above-described embodiment.

Referring to FIG. 7, the structures of the magnetic bearing 200 and the airfoil bearing 100 proposed in the present disclosure can be thought of as a parallel connection of the stiffness (KM) and damping (CM) of the magnetic bearing and the stiffness (KA) and damping (CA) of the airfoil bearing.

In the case of a magnetic bearing, the thrust disk 301 is supported using electromagnetic force and no axial displacement occurs due to external force.

The pad 30 of the airfoil bearing is rigidly supported by the pole portion 11 and 13 of the magnetic bearing, so axial displacement does not occur, and as a result, the stiffness and damping of airfoil bearings and magnetic bearings can be calculated through parallel connection.

The stiffness and damping connected in parallel can increase the stiffness and damping of the entire hybrid bearing, thereby improving the axial load capacity of a turbomachinery.

As described above, the hybrid thrust bearing according to one embodiment has an advantageous structure for damping not only axial load but also lateral vibration of the turbomachinery.

The thrust disk, mounted on the rotor shaft of a turbomachinery to support axial loads, rotates in a disc-shaped form and tilts during rotation. Increasing the size of the thrust disk to enhance its axial load capacity can result in a greater tilt angle.

Additionally, in the case of magnetic bearings, there may be a difference in tilt depending on the location of the sensor that measures the axial displacement of the thrust disk, so the tilt phenomenon may persist, and the inclination of the thrust disk has a significant impact on lateral vibration, which can cause friction and wear of the journal bearing and instability of the system.

However, in the integrated structure of the hybrid thrust bearing proposed by the present disclosure, when the thrust disk rotates with a tilt, the tilt of the thrust disk can be reduced through the magnetic bearing, thereby improving the axial load capacity without detoriating the performance of the airfoil bearing.

Figure 8:
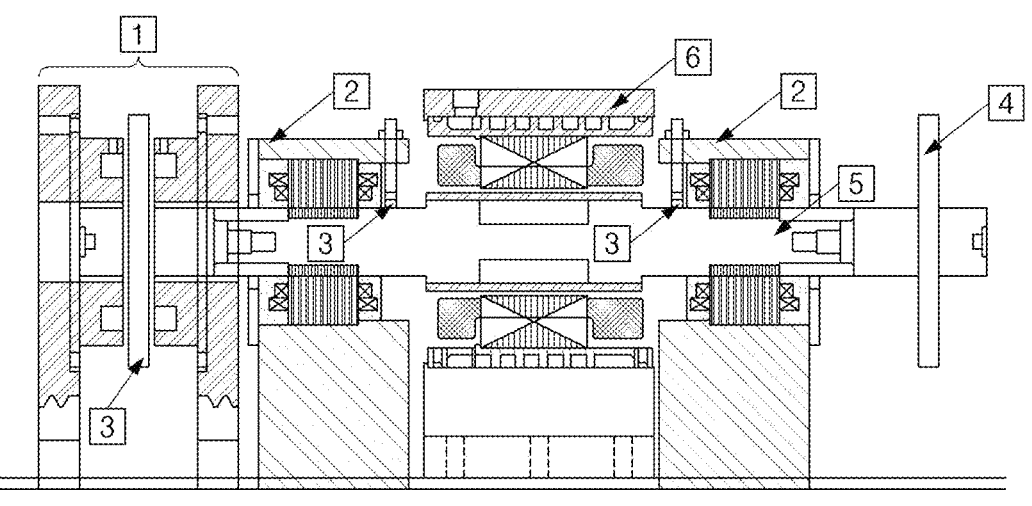
FIG. 8 shows a schematic configuration of a test equipment for testing a performance of a hybrid thrust bearing described above.

FIG. 8 shows the schematic configuration of test apparatus for performance testing of the aforementioned hybrid thrust bearing.

This test apparatus includes a hybrid magnetic thrust bearing (1), a magnetic journal bearing (2), a journal location sensor (3), a thrust collar (disk) (4), a rotor shaft (5), and a motor (6) having the above-described configuration.

To evaluate the performance of a pure hybrid thrust magnetic bearing, the journal of the test rotor was configured to enable non-contact rotation using active magnetic journal bearings.

In order to check the performance of the thrust airfoil bearing in a stationary and rotating state, the test rotor is mounted on an induction motor, and through this, the influence of the airfoil bearing can be confirmed depending on the rotation speed.

Figure 9:
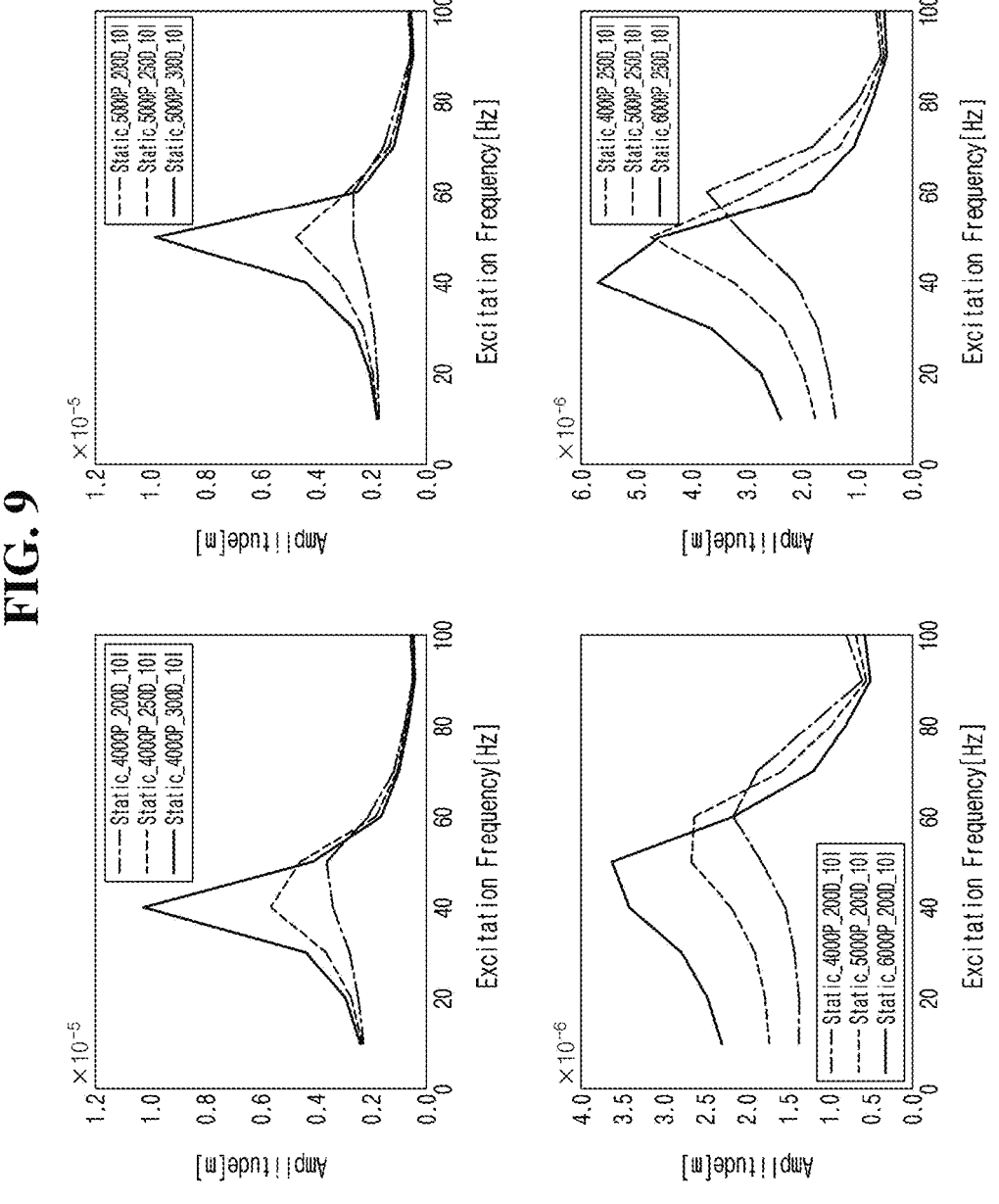
FIGS. 9 and 10 show results of experiments.
Figure 10:
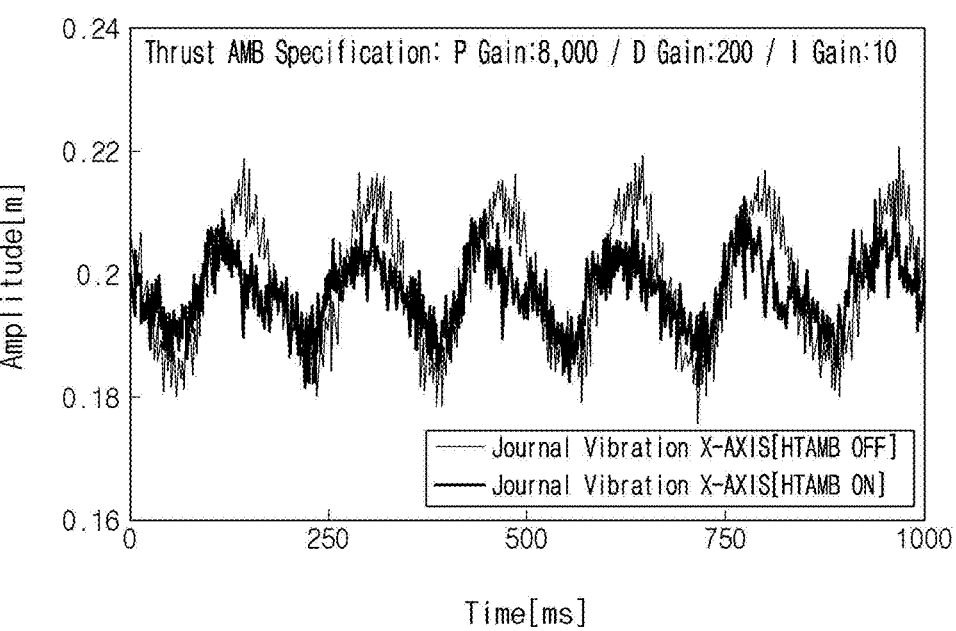

The configuration of the test apparatus is as shown in FIG. 8, and the experimental results are as shown in FIGS. 9 and 10.

FIG. 9 shows results of bearing performance experiments according to current stiffness and PID gain values.

In order to confirm the performance of the hybrid thrust bearing described above, the experiment conducted a performance test after installing the hybrid thrust bearing on the test apparatus introduced in FIG. 8, and conducted a controllability experiment according to the main effective parameters such as PID gain, gap, and current values.

As can be seen through FIG. 9, it is confirmed that the hybrid thrust bearing of the present disclosure can be controlled according to the PID gain value.

FIG. 10 is a graph showing results of a lateral vibration damping experiment.

In this experiment, after exciting the magnetic bearing 200 at a constant frequency, the vibration of the journal is measured according to the on/off of the hybrid thrust bearing. As a result of the experiment, when the hybrid thrust bearing is turned on, it is confirmed that the lateral vibration of the journal is reduced by about 20%.

In the above, the present disclosure has been examined focusing on its various embodiments. Those skilled in the patent of the present disclosure will understand that various embodiments may be implemented in modified forms without departing from the essential characteristics of the present disclosure. Therefore, the disclosed embodiments should be considered from an illustrative rather than a restrictive perspective. The scope of the present disclosure is indicated in the claims rather than the foregoing description, and all differences within the equivalent scope should be construed as being included in the present disclosure.

What is claimed is:

1. A hybrid thrust bearing that combines an airfoil bearing and a magnetic bearing to support a rotating shaft with a disk-shaped thrust disk, the magnetic bearing comprising:

a disk-shaped housing into which the rotation shaft is inserted through a hole formed in a center and facing the thrust disk;

a ring-shaped inner pole part formed around the hole on one side of the housing facing the thrust disk;

a ring-shaped outer pole part disposed outside the inner pole part;

an attachment part provided between the inner pole part and the outer pole part; and a coil stored in the attachment part, wherein a part of the airfoil bearing is inserted into the attachment part, wherein the airfoil bearing includes an airfoil pad that covers an upper surface of the coil and is installed on the attachment part, and wherein a depth of the attachment part is a combined thickness of the coil and the airfoil pad.

2. The hybrid thrust bearing of claim 1, wherein the airfoil bearing further includes:

a thrust bump foil installed over the airfoil pad; and a top foil installed over the thrust bump foil, wherein the thrust bump foil and the top foil are located outside the attachment part.

3. The hybrid thrust bearing of claim 1, wherein the outer pole part further includes a column protruding outward, and the airfoil pad is fastened to the column.

4. The hybrid thrust bearing of claim 3, wherein the airfoil pad further includes an extension portion extending above the column and coupled to the column.

5. The hybrid thrust bearing of claim 4, wherein the outer pole part further includes a slot that guides a connection portion to a part where the column is connected.

6. The hybrid thrust bearing of claim 1, wherein a surface area of the inner pole part is less than a surface area of the outer pole part.

* * * * *